Sept 8, 1925.

A. SEGUIN

APPARATUS FOR MEASURING SPEED

Filed Dec. 22, 1921

1,552,575

INVENTOR:
Augustin Seguin
By
his ATTORNEY.

Patented Sept. 8, 1925.

1,552,575

UNITED STATES PATENT OFFICE.

AUGUSTIN SEGUIN, OF PARIS, FRANCE.

APPARATUS FOR MEASURING SPEED.

Application filed December 22, 1921. Serial No. 524,064.

*To all whom it may concern:*

Be it known that I, AUGUSTIN SEGUIN, citizen of the French Republic, residing at Paris, in the Republic of France, have invented new and useful Improvements in Apparatus for Measuring Speed, of which the following is a specification.

The present invention has for its object an apparatus serving for the measurement of speed, of the type comprising a main element rotating at a speed constantly proportional to the speed to be measured and an element of comparison whose speed is not proportional to the speed to be measured.

A characteristic feature of the invention resides in that the main element revoluble at a speed proportional to the speed to be indicated, is constituted by an involute cam which puts under tension the element of comparison (spring, balance wheel or like element) adapted to swing about a point which is distinct from the axis of rotation of the cam, the latter gradually separating the element of comparison from the inoperative position thereof and subsequently effecting the abrupt release of the same, the said element of comparison again entering in contact with the cam at various points situated thereupon and corresponding to different radii according to the speed to be indicated.

Other features of the invention will appear from the following description.

In the accompanying drawing given by way of example:

Figure 1:
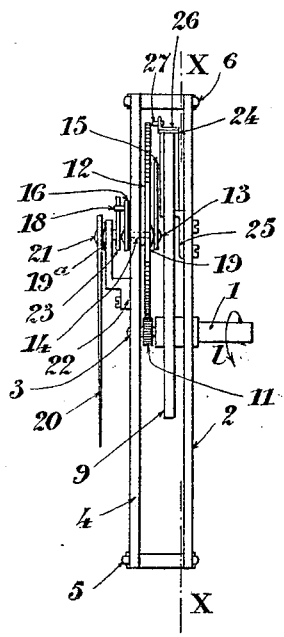
Fig. 1 is a side view of the apparatus.
Figure 3:
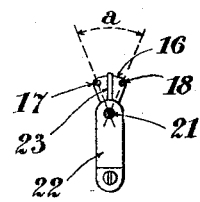
Fig. 3 is a front view of the element connecting the indicating pointer with the intermediate arm.
Figure 2:
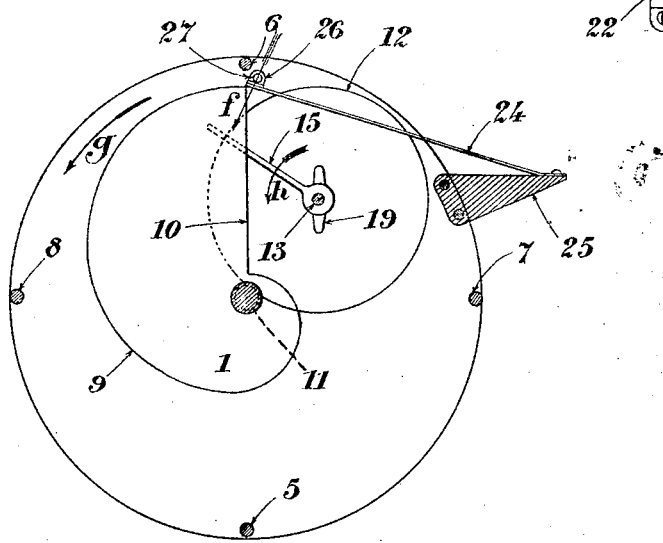
Fig. 2 is a section on X—X (Fig. 1).

The movement whose speed is to be measured is transmitted to the apparatus by a shaft 1, either directly or through the intermediary of a speed-raising or a speed-reducing device. This shaft extends through a bearing provided in the plate 2 of the apparatus and at its other end rests in another bearing 3 provided in the plate 4. The plates 2 and 4 maintained by the cross-pieces 5, 6, 7, 8 form the body of the apparatus (the cross pieces 7 and 8 are not represented in Fig. 1 for the sake of clearness). The shaft 1 has secured thereon a cam 9 having an involute shape with a radial part 10, and a small gear wheel 11 engaging a large gear wheel 12. The gear wheel 12 rotates on a shaft 13 which is rotatably mounted in a bearing 14 on the plate 4. The shaft 13 has secured thereto at one of its ends an intermediate arm 15 and at its other end an arm 16 carrying two studs 17 and 18 having between them the angle *a* (Fig. 3). The large gear wheel 12 may entrain the intermediate arm 15 through the medium of any friction system, for instance a spring 19, permitting normally the gear wheel 12 to entrain said arm 15 but permitting this arm to rotate in the contrary sense to this entraining as soon as it is impelled by a force in the contrary sense as will be explained hereunder. The indicating pointer 20 is fixed on a shaft 21 which is mounted by friction in a bearing on a bridge piece 22 secured to the plate 4. This friction mounting, which is obtained by any suitable means, for instance a small spring blade 19ᵃ secured to the shaft 21 and bearing on the bridge piece 22, has for its object to permit the indicating pointer 20 to remain stable at a determined position according to the speed to be measured. This shaft 21 possesses at its other end and secured thereto, an arm 23 which strikes in one sense or the other upon the studs 17 and 18. The indicating pointer 20 moves before a dial fixed to the plate 4 and not shown in the figure.

A spring blade 24 secured at one of its ends to a support 25 which is itself secured to the plate 2, is caused to rub at its other end on the periphery of the cam 9 and is set in such manner as to return to its inactive position in the sense of the arrow *f* when not prevented by the cam 9. This spring carries at this same end a small angle piece 26 perpendicular to which is secured a stud 27 which strikes against and entrains the intermediate arm 15 when the spring 24 returns to its inactive position and entrains the stud in the sense of the arrow *f*.

The shaft 1 rotating in the sense of the arrow *l* at a speed proportional to that which is to be measured will entrain at the same speed the cam 9 in the sense of the arrow *g*, and the spring 24 will be thus tensioned to a greater degree according as it rubs upon the parts of the cam 9 having a greater radius, until it arrives at the radial part 10 of the cam, and will then return freely to its inactive position, entraining in the sense of the arrow *f* with a periodic movement the stud 27 which represents the element possessed of a movement of comparison at a speed which is not proportional to that which is to be measured. But since during this movement the cam 9 continues to rotate at a speed proportional to that which is to be measured, the spring 24 will again come in contact with the cam 9 at points on this cam having different radii according to the speed of this cam and at a point having always the same radius for a constant speed. The stud 27 will thus descend by a greater or less amount, entraining the intermediate arm 15 while causing the spring 19 to slide on the gear wheel 12 in the sense of the arrow h to a greater or less extent according to the speed to be measured, and entraining it to a point which is fixed for a constant speed. But after the contact of the spring 24 with the cam 9, this cam when rotating will again set the spring 24, and the intermediate arm 15 being no longer impelled by the stud 27 will be entrained by the gear wheel 12 through the intermediary of the spring 19 in the contrary sense to the arrow h and this entraining will last until the stud 27 again encounters the intermediate arm 15 and entrains the same in the sense of the arrow h. If the speed to be measured is constant, the intermediate arm 15 will thus oscillate constantly between two fixed positions, which are well determined, depending upon this speed to be measured and making between themselves an angle c. If the speed to be measured diminishes, the intermediate arm 15 will be driven lower by the stud 27, and if this speed then returns to a constant value, it will oscillate constantly, after reaching this new position which depends on the new speed, through an angle practically equal to c. If the speed to be measured increases, the stud 27 will descend to a less degree and the gear wheel 12 will raise the intermediate arm 15, bringing it back in contact with the stud 27, and if this speed becomes constant it will constantly oscillate about this new position determined by the new falling movement of the stud 27 and depending on the new speed, through an angle practically equal to c.

It is thus observed that if the angle a, formed between the studs 17 and 18, is given the value c, the indicating pointer 20 actuated by the small arm 23 will have a position which is fixed and well determined for each value of the speed to be measured.

It should be remarked that I may give to the angle a a value higher than c and thus determine a dead angle (a—c) which will permit the indicating pointer 20 to move only for a determined variation of the speed to be measured.

Having now described my invention what I claim as new and desire to secure by Letters Patent is:

1. An apparatus for the measurement of speed, comprising an involute cam, means for rotating said cam at a speed which is constantly proportional to that to be measured, an oscillating comparison member pivoted at a point which is remote from the axis of rotation of the cam and adapted to engage with the cam so as to be gradually moved away from its inoperative position, said comparison member embodying means for returning the same towards its inoperative position at a speed which is not proportional to that to be measured, indicating means adapted to be driven in the direction of the increasing speeds by said comparison member when the latter is returning towards the cam, and means for yieldably shifting said indicating means in the opposite direction.

2. An apparatus for the measurement of speed, comprising an involute cam, means for rotating said cam at a speed which is constantly proportional to that to be measured, an oscillating comparison member pivoted at a point which is remote from the axis of rotation of the cam and adapted to engage with the cam so as to be gradually moved away from its inoperative position, said comparison member embodying means for returning the same towards its inoperative position at a speed which is not proportional to that to be measured, a revoluble intermediate member adapted to be engaged by the comparison member and moved thereby in its return stroke, means for yieldably shifting said intermediate member in the opposite direction and indicating means operated by said intermediate member.

3. An apparatus for the measurement of speed comprising an involute cam, means for rotating said cam at a speed which is constantly proportional to that to be measured, an oscillating comparison member pivoted at a point which is remote from the axis of rotation of the cam and adapted to engage with the cam so as to be gradually moved away from its inoperative position, said comparison member embodying means for returning the same towards its inoperative position at a speed which is not proportional to that to be measured, a revoluble intermediate member adapted to be engaged by the comparison member and moved thereby in its return stroke, means for rotating said intermediate member in the opposite direction, said means comprising a small gear wheel on the shaft of the cam, a larger gear wheel in engagement with the small gear wheel, and a friction coupling between the larger gear wheel and the intermediate member, and indicating means operated by said intermediate member.

4. An apparatus for the measurement of speed, comprising an involute cam, means for rotating said cam at a speed which is constantly proportional to that to be measured, an oscillating comparison member pivoted at a point which is remote from the axis of rotation of the cam so as to be gradually moved away from its inoperative position, said comparison member embodying means for returning the same towards its inoperative position at a speed which is not proportional to that to be measured, a revoluble intermediate member adapted to be engaged by the comparison member and moved thereby in its return stroke, a revoluble indicating pointer, a friction device for braking the rotation of said indicating pointer and means for operatively connecting the intermediate member to the indicating pointer, said means embodying two spaced studs adapted to rotate with one of said elements and an arm adapted to rotate with the other element and located between said spaced studs.

5. An apparatus for the measurement of speed embodying a comparison member, means for impelling the comparison member in a predetermined direction, an involute cam adapted to be rotated at a speed proportional to the speed to be measured and coacting with the comparison member for opposing the force of the impelling means and retracting the comparison member, said cam being adapted, through its rotation, to periodically release the comparison member for movement by the impelling means, and indicating means adapted to be driven in such predetermined direction by the comparison member and means tending to drive constantly said indicating means in a counter direction.

6. An apparatus for the measurement of speed embodying a driven element, means for moving said driven element in one direction, indicating means operatively connected with said driven element, a comparison element mounted to swing in a counter direction at a speed not proportional to the speed to be measured and adapted to engage with and move the driven element in such counter direction, and means operable at a speed proportional to the speed to be measured for disengaging the comparison element from the driven member.

7. An apparatus for the measurement of speed embodying a driven element frictionally driven about a fixed axis in one direction, indicating means operatively connected with said driven element, a comparison element mounted to swing in a counter direction about a distant point at a speed not proportional to the speed to be measured and adapted to engage with and move the driven element in such counter direction, and an involute cam operable at a speed proportional to the speed to be measured for disengaging the comparison element from the driven member.

In testimony whereof I have signed my name to this specification.

AUGUSTIN SEGUIN.